(12) United States Patent
Kaburagi et al.

(10) Patent No.: US 12,474,492 B2
(45) Date of Patent: Nov. 18, 2025

(54) RADIATION ANALYSIS METHOD, RADIATION ANALYSIS DEVICE, AND RADIATION DETECTOR

(71) Applicant: JAPAN ATOMIC ENERGY AGENCY, Ibaraki (JP)

(72) Inventors: Masaaki Kaburagi, Ibaraki (JP); Kenji Shimazoe, Tokyo (JP)

(73) Assignee: JAPAN ATOMIC ENERGY AGENCY, Ibaraki (JP)

( * ) Notice: Subject to any disclaimer, the term of this patent is extended or adjusted under 35 U.S.C. 154(b) by 325 days.

(21) Appl. No.: 18/031,002

(22) PCT Filed: Oct. 8, 2021

(86) PCT No.: PCT/JP2021/037367
§ 371 (c)(1),
(2) Date: Apr. 9, 2023

(87) PCT Pub. No.: WO2022/075455
PCT Pub. Date: Apr. 14, 2022

(65) Prior Publication Data
US 2023/0375732 A1    Nov. 23, 2023

(30) Foreign Application Priority Data
Oct. 9, 2020    (JP) .................. 2020-171244

(51) Int. Cl.
*G01T 1/36* (2006.01)
*G01T 1/20* (2006.01)

(52) U.S. Cl.
CPC ............ *G01T 1/362* (2013.01); *G01T 1/2002* (2013.01); *G01T 1/2008* (2013.01)

(58) Field of Classification Search
CPC ...... G01T 1/362; G01T 1/2002; G01T 1/2008
See application file for complete search history.

(56) References Cited

U.S. PATENT DOCUMENTS

| 2011/0205361 A1 | 8/2011 | Guillot |
| 2016/0003950 A1 | 1/2016 | Fontbonne et al. |
| 2017/0234997 A1 | 8/2017 | Corre et al. |

FOREIGN PATENT DOCUMENTS

| CN | 102819034 B | 5/2014 |
| JP | 2006329784 A | * 12/2006 |

(Continued)

OTHER PUBLICATIONS

Giaz A et al: "Characterization of large vol. 3.5"×8 ' LaBr3:Ce de", Nuclear Instruments & Methods in Physics Research. Section A, vol. 729, Aug. 3, 2013(Aug. 3, 2013), pp. 910-921, XP028755984, ISSN: 0168-9002, DOI: 10.1016/J.NIMA.201307.084.

(Continued)

*Primary Examiner* — David P Porta
*Assistant Examiner* — Fani Polyzos Boosalis
(74) *Attorney, Agent, or Firm* — Hawaii Patent Services; Nathaniel K. Fedde; Kenton N. Fedde

(57) ABSTRACT

This invention enables highly accurate sample analysis by analyzing energy spectra obtained using a radiation detector, even under a high dose-rate environment. In a radiation analysis method disclosed here, first, a spectrum of a sample (measured spectrum) is measured by a radiation detector (sample measurement step: S1). The measured spectrum is obtained for each of different setting conditions, where a plurality of scintillators having different sizes and a plurality of shields having different thicknesses are used, respectively. Next, similar measurement is performed on a reference source (reference source measurement step: S2). Next, from reference spectra thus obtained in S2, a background nuclide-originating component, which is a component originating from a background nuclide ($^{137}Cs$) included in the measured spectra, is estimated (background nuclide-originating component estimation step: S3). Next, a corrected spectrum is calculated as the difference between the measured spectrum (Continued)

and the background nuclide-originating component (corrected spectrum calculation step: S4).

10 Claims, 11 Drawing Sheets

(56) References Cited

FOREIGN PATENT DOCUMENTS

| JP | 2014066518 A | * | 4/2014 |
|----|--------------|---|--------|
| JP | 2014-173991 A | | 9/2014 |
| JP | 2015-141158 A | | 8/2015 |
| JP | 2016-513256 A | | 5/2016 |
| JP | 6507439 B | | 5/2019 |

OTHER PUBLICATIONS

Quarati F.G.A: "LaBr3 gamma-ray spectrometers for space applications", Jan. 22, 2013(Jan. 22, 2013), XP055875518, Retrieved from the Internet: URL: https://repository.tudelft.nl/record/uuid:7d1f7672-5d97-4b32-9c44-ad0bcc259b82 [retrieved on Dec. 22, 2021].

Moszynski M et al: "Status of Timing With Plastic Scintillation Detectors", Jan. 1, 1979 (Jan. 1, 1979), XP093205307, Retrieved from the Internet: URL: https://www.sciencedirect.com/science/article/pii/S0029554x79901708 [retrieved on Sep. 16, 2024].

* cited by examiner

RADIATION ANALYSIS METHOD, RADIATION ANALYSIS DEVICE, AND RADIATION DETECTOR

BACKGROUND

Technical Field

The present invention relates to a radiation analysis method and a radiation analysis device both for analyzing a radiation source contained in a sample by measuring a spectrum of radiation (γ-rays, X-rays, and the like), and also relates to a radiation detector used therein.

Background Art

For detecting the presence of a radionuclide, it is effective to use a method of detecting radiation (γ-rays or the like) emitted when the nuclide decays, wherein a radiation detector capable of measuring an energy spectrum of the radiation is used. In such a case, γ-rays are generally used as the radiation, and since γ-rays emitted by different nuclides generally have different energies, a nuclide present in a sample can be identified from an energy spectrum of γ-rays detected from the sample (radiation environment). Such a technology is described, for example, in Patent Document 1.

Known radiation detectors capable of measuring a γ-ray spectrum in the above-described manner include, for example, the one using a semiconductor element such as of Ge, CdTe or the like, and the one using a scintillator. In the latter one, the scintillator emits visible light photons by absorbing γ-ray photons, and the visible light photons are detected by a photomultiplier tube. In a detector constituted by combining a scintillator and a photomultiplier tube, in principle, each time one γ-ray photon is detected, a pulse output with a short duration corresponding to the γ-ray photon is obtained, where the charge amount (or waveform integral) of the pulse corresponds to energy of the detected γ-ray. Accordingly, a histogram of the charge amount (or waveform integral) of detected pulses corresponds to a detected energy spectrum. Even when a plurality of kinds of nuclides are simultaneously present in a sample, it is possible to identify the presence of each nuclide if peaks each corresponding to the energy of a γ-ray emitted by the individual nuclide can be separately identified in the spectrum However, the resolution (energy resolution) in the spectrum obtained in the above-described way is determined by the type of the radiation detector, and it accordingly is difficult, in practice, to individually identify more than two kinds of nuclides simultaneously present in the sample, when they emit γ-rays having energies close to each other. Therefore, in the case of using a scintillator, for example, a scintillator material to enable obtaining an energy resolution according to the purpose is selected.

CITATION LIST

Patent Literature

[Patent Document 1] Japanese translation of PCT international application No. 2016-513256

SUMMARY OF INVENTION

Technical Problem

For example, in measurement on a sample (measurement environment) associated with a nuclear reactor, there exist various radionuclides, among which, for example, the presence rate of $^{137}Cs$ is high, and accordingly γ-rays emitted by $^{137}Cs$ are detected in a particularly large amount and are of a high dose rate. In such an environment, in order to identify the presence of a radionuclide other than $^{137}Cs$, it is necessary to identify a peak of γ-rays emitted by the radionuclide other than $^{137}Cs$ in a γ-ray spectrum greatly influenced by the γ-rays emitted by $^{137}Cs$.

Further, while $^{137}Cs$ emits monochromatic γ-rays with an energy of 662 keV, when detecting the monochromatic γ-rays by a radiation detector in practice, a variety of components generated in the process of absorbing the monochromatic γ-rays by the radiation detector are detected, in addition to the γ-rays with an energy of 662 keV. When the presence rate of $^{137}Cs$ in the sample is high, the additional components also increase and become obstacles to identification of γ-rays emitted by other nuclides. For example, γ-rays (X-rays) having a continuous spectrum on the lower energy side than that due to Compton scattering of the monochromatic γ-rays with an energy of 662 keV are generated in the scintillator, and the component also is detected by the radiation detector at the same time.

Further, as described above, the charge amount (or waveform integral) of a pulse having appeared as an output of the radiation detector corresponding to a single γ-ray photon detected therein corresponds to the energy of the γ-ray photon, and a prerequisite for enabling the identification described here is that individual γ-ray photon can be separately detected by the radiation detector. In this respect, it is possible that two or more γ-ray photons are detected to yield a single pulse as a result of their superposition. For example, when the γ-ray dose rate is high and, accordingly, another γ-ray photon is detected during the duration of a pulse corresponding to a γ-ray photon, there may be a case (pile-up) where a single pulse having a charge amount (or waveform integral) not corresponding to either of energies of the two γ-ray photons is detected as a result of superposition of pulses respectively corresponding to the two γ-ray photons. Further, a similar phenomenon (sum effect) occurs when decay of a nuclide emitting γ-rays occurs in two steps, each emitting γ-rays, with a short time constant. In the cases described above, spurious peaks or background components corresponding to the pulses are generated in the γ-ray spectrum When the presence rate of a specific radionuclide ($^{137}Cs$) is particularly high as described above, the above-described components caused by monochromatic γ-rays emitted by the nuclide are detected at different energies from that of the monochromatic γ-rays, and adversely affect detection of γ-rays emitted by another radionuclide. This adverse effect is posed even on identification of a radionuclide that emits γ-rays with an energy away from 662 keV, for example, when the presence rate of $^{137}Cs$ is high. Such a situation is similar also when the presence rate is high for a large number of kinds of radionuclides, not only when the presence rate is high for a single kind of radionuclide, and accordingly, similarly occurs in general when analyzing nuclides by γ-ray spectrum analysis under a high dose-rate environment.

For the reason, it has been desired that analysis of a sample can be performed with high accuracy by analyzing an energy spectrum obtained by a radiation detector even under a high dose-rate environment.

The present invention is made in view of the above-described problem, aiming at providing an invention that solves the problem.

Solution to Problem

To solve the above-described problem, the present invention has been configured as follows.

A radiation analysis method according to the present invention is a radiation analysis method for identifying a plurality of kinds of radioactive nuclides simultaneously contained in a sample by measuring an energy spectrum of radiation emitted from the sample, which is characterized by including: defining a plurality of conditions that yield different detection intensities on the same measurement target as setting conditions in a radiation detector for detecting the radiation; a sample measurement step of obtaining a measured spectrum that is an energy spectrum measured on the sample by the radiation detector; a background nuclide-originating component estimation step of estimating a background nuclide-originating component that is a component originating from a background nuclide corresponding to one of the nuclides having a largest contribution to the radiation, from results obtained by performing the measurement by the radiation detector under respective ones of the setting conditions; a corrected spectrum calculation step of calculating a corrected spectrum by subtracting the background nuclide-originating component from the measured spectrum; and performing analysis of the sample using the corrected spectrum.

The radiation analysis method according to the present invention is characterized by including: a reference source measurement step of obtaining reference spectra that each are an energy spectrum obtained by measuring radiation emitted from a reference source composed of the background nuclide, under respective ones of the setting conditions; and estimating the background nuclide-originating component, in the background nuclide-originating component estimation step, by comparing the reference spectra with the measured spectra.

The radiation analysis method according to the present invention is characterized by that setting of a distance between the radiation detector and the reference source in the reference source measurement step is included in the setting conditions.

The radiation analysis method of the present invention is characterized by that a plurality of shields for absorbing, and thereby limiting at different degrees, the radiation entering the radiation detector are selectively provided in the radiation detector, one at one time, and that the selection among the shields is included in the setting conditions.

The radiation analysis method according to the present invention is characterized by that the radiation detector includes a scintillator that emits light by absorbing the radiation and a photodetector that detects the light, wherein the scintillator is the one that is selectively used from among the ones having different sizes, and that the selection of a size of the scintillator is included in the setting conditions.

The radiation analysis method according to the present invention is characterized by that the photodetector is a photomultiplier tube.

The radiation analysis method according to the present invention is characterized by that the photomultiplier tube includes a cathode, an anode, and a plurality of dynodes between the cathode and the anode, and that the photomultiplier tube is provided with a voltage variation suppressing means for suppressing variation in a voltage applied between the anode and a last stage dynode that is the dynode adjacent to the anode, the variation being caused by increase in current flowing between the anode and the last stage dynode at a time of detecting the light.

The radiation analysis method according to the present invention is characterized by that the voltage variation suppressing means suppresses variation in a voltage applied between the last stage dynode and the dynode adjacent to the last stage dynode, the variation being caused by increase in current flowing between the last stage dynode and the dynode adjacent to the last stage dynode The radiation analysis method according to the present invention is characterized by that the background nuclide is $^{137}$Cs or $^{60}$Co.

A radiation analysis device according to the present invention is a radiation analysis device for executing the above-described radiation analysis method, which is characterized by including a calculation unit that calculates the background nuclide-originating component by executing the background nuclide-originating component estimation step, and calculates the corrected spectrum by executing the corrected spectrum calculation step.

A radiation detector according to the present invention is a radiation detector constituted by combining a scintillator that emits light by absorbing radiation and a photomultiplier tube that detects the light and includes a plurality of dynodes between a cathode and an anode, the radiation detector being characterized by that it selectively uses one of a plurality of scintillators having different sizes as the scintillator, and that it is provided with a voltage variation suppressing means for suppressing variation in a voltage applied between the anode and a last stage dynode that is the dynode adjacent to the anode, the variation being caused by increase in current flowing between the anode and the last stage dynode at a time of detecting the light.

The radiation detector according to the present invention is characterized by that the voltage variation suppressing means suppresses variation in a voltage applied between the last stage dynode and the dynode adjacent to the last stage dynode, the variation being caused by increase in current flowing between the last stage dynode and the dynode adjacent to the last stage dynode.

The radiation detector according to the present invention is characterized by being selectively provided with a plurality of shields for absorbing, and thereby limiting at different degrees, the radiation entering the scintillator, one at one time.

Advantageous Effects of Invention

Being configured as described above, the present invention enables the sample analysis with high accuracy by analyzing the energy spectrum obtained by the radiation detector even under a high dose environment.

DETAILED DESCRIPTION

Hereinafter, a radiation analysis method according to an embodiment of the present invention will be described. In the radiation analysis method, from a spectrum of radiation (γ-rays) obtained by a radiation detector, a nuclide having emitted the radiation is identified. There, even when the radiation is of a high dose-rate and radiation emitted by a nuclide to be detected accordingly is not easy to identify in the spectrum, the identification can be performed with high accuracy.

Here, it is assumed that a sample to be measured is a part of the environment of a nuclear facility or a radiation facility and accordingly has a high radiation dose-rate, where, particularly, influence of γ-rays emitted by $^{137}$Cs is greatest in detected radiation (γ-rays). A radiation detector used for detecting γ-rays in the present case is a combination of a scintillator and a photomultiplier tube, where, when a single γ-ray photon enters the scintillator, pulse-form visible light (pulsed light) is emitted from the scintillator by its absorbing the γ-ray photon. The pulsed light is detected by the photomultiplier tube, whose voltage output becomes of a pulse form corresponding to the pulsed light as described above, and ideally the charge amount (or waveform integral) of the pulsed output corresponds to energy of the γ-ray photon absorbed by the scintillator. The scintillator and the photomultiplier tube used here are determined such that γ-rays in a target energy range are measured with high efficiency, which will be described in detail later.

Figure 1:
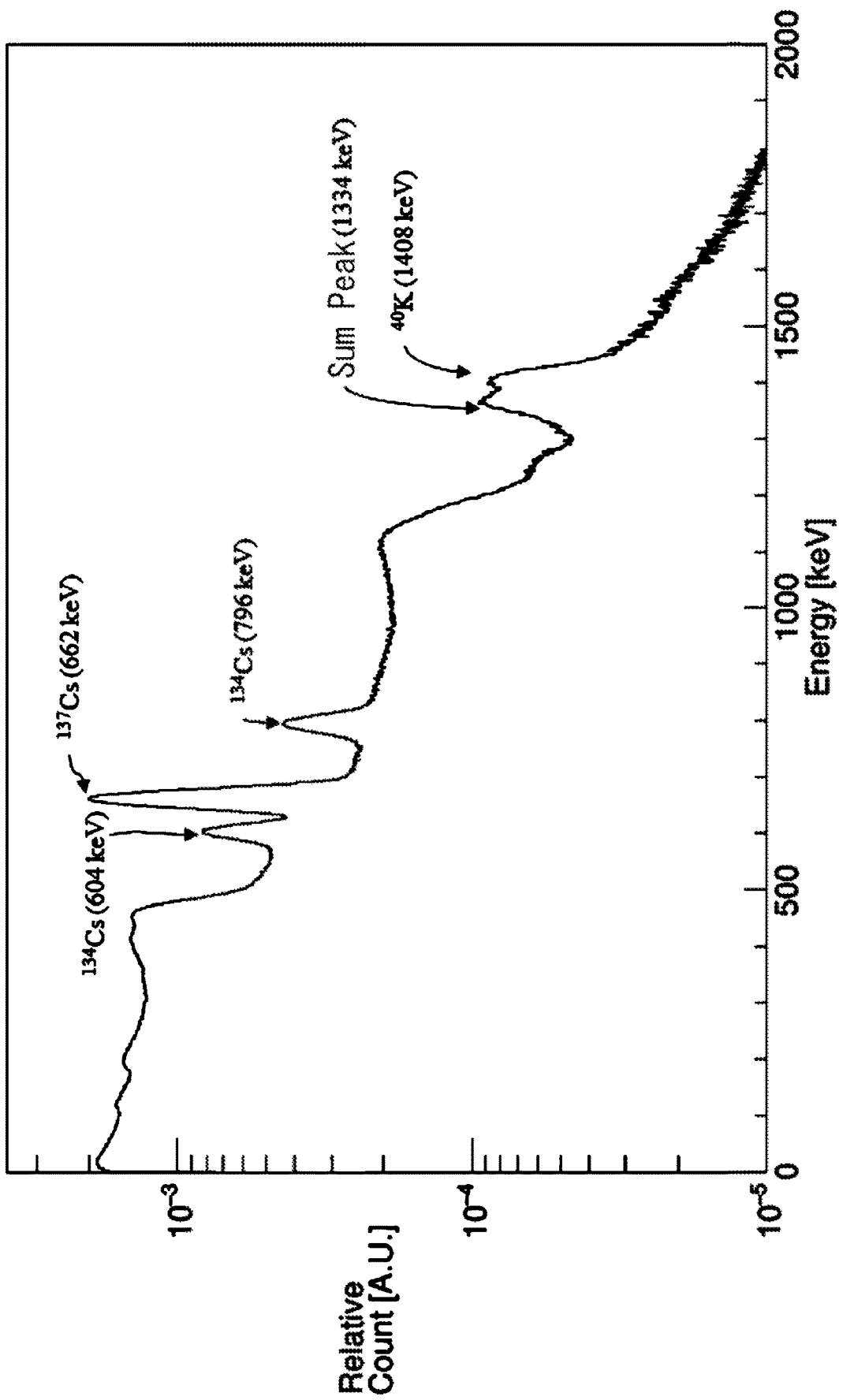
FIG. 1 is an example of a measured spectrum obtained from a high dose-rate sample.

However, particularly under a high dose-rate environment, there are generated, in practice, not a few components for which the pulse charge amount (or waveform integral) does not correspond to the energy of a γ-ray photon absorbed by the scintillator. FIG. 1 is a result of simulating a measurement result under a high dose-rate environment associated with a nuclear facility or radiation facility. In the figure, for each of identified peaks, its energy and a nuclide to emit γ-rays of the energy are indicated, where peaks corresponding to γ-rays emitted by $^{137}$Cs (662 keV), $^{134}$Cs (604 keV and 796 keV) and $^{40}$K (1408 keV) are observed. While the γ-rays emitted by the nuclides each are monochromatic, they are recognized in the spectrum each as a distribution with its peak corresponding to the γ-ray energy and having an extent determined by energy resolution of the detector. Among them, the peak of $^{137}$Cs (662 keV) is most prominent. Here, besides these peaks, particularly a high intensity continuous component is recognized on the low energy side, which includes a component due to Compton scattering of γ-rays of $^{137}$Cs (662 keV) in the scintillator, such as described before. The peak at 1334 keV (twice 662 keV) on the high energy side is that due to the sum effect of $^{137}$Cs (662 keV), such as described before.

Figure 2:
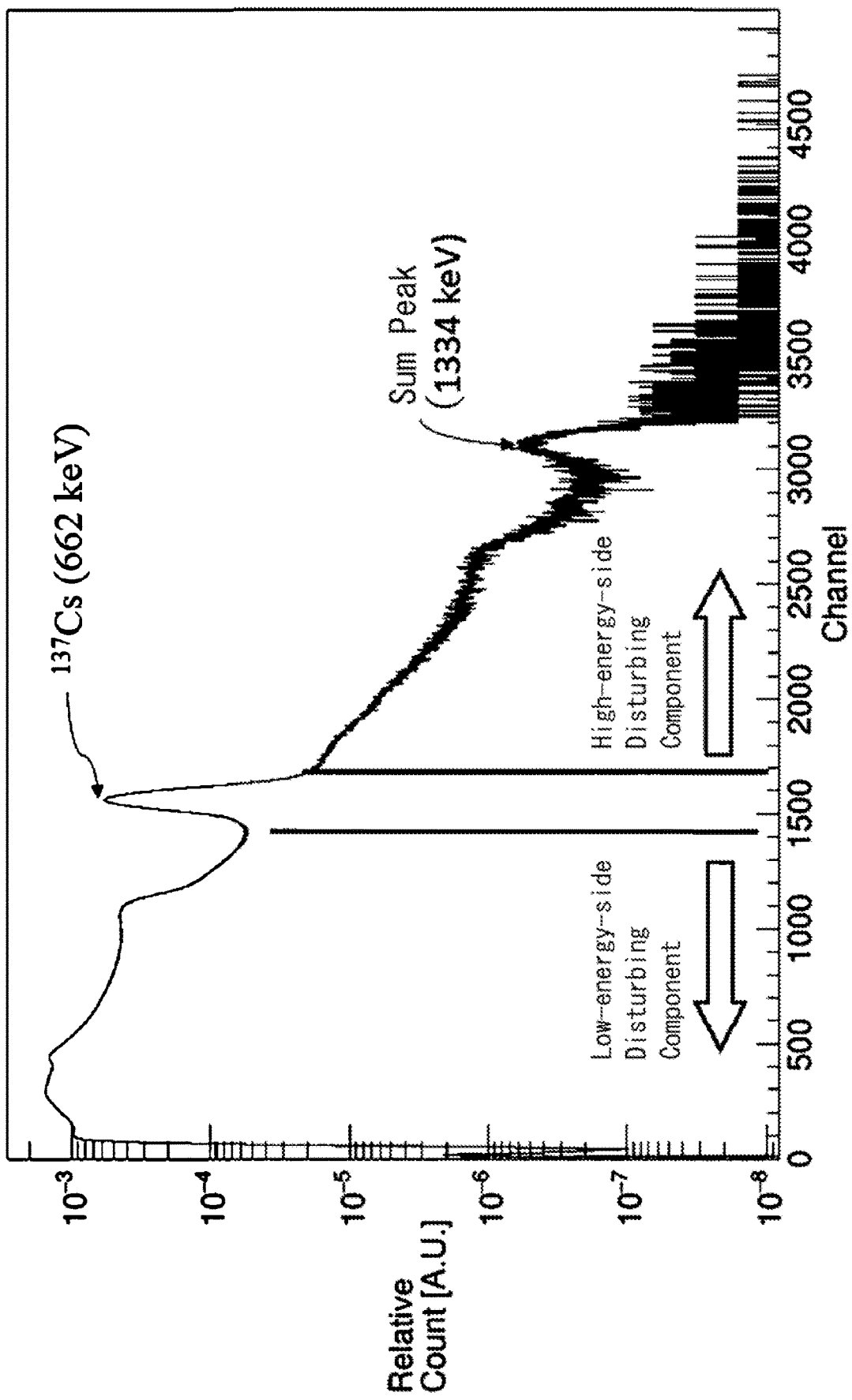
FIG. 2 is an example of a reference spectrum obtained from a reference source composed of $^{137}$Cs

FIG. 2, on the other hand, is a measured spectrum in a case a $^{137}$Cs source was measured as a reference sample by a similar detector. Here, the horizontal axis represents the detector channel corresponding to γ-ray energy, and the vertical axis represents the count (the number of detected γ-rays). Also in this case, a peak (corresponding to 662 keV) by which monochromatic γ-rays of 662 keV emitted by $^{137}$Cs is recognized with an extent determined by energy resolution of the radiation detector is present, and also present are the above-described continuous component on the low energy side including the effect of Compton scattering and the above-described peak due to the sum effect. As the peak due to the sum effect is close to a peak due to $^{40}$K, as seen in FIG. 1, it greatly affects detection accuracy of $_{40}$K. In FIG. 2, the component on the lower energy side than the peak at 662 keV (low-energy-side disturbing component) includes the component generated by Compton effect, and the component on the higher energy side than the peak at 662 keV (high-energy-side disturbing component) includes the component generated by the sum effect and that by pile-up and the like. Most of the low-energy-side disturbing component and of the high-energy-side disturbing component are particularly prominent when the presence amount of $^{137}$Cs is large, and significantly affect identification of a peak due to a nuclide other than $^{137}$Cs in FIG. 1

Accordingly, it is expected that, by subtracting the components due to $^{137}$Cs such as shown in FIG. 2 from the spectrum of FIG. 1, a spectrum with a γ-ray peak due to a nuclide other than $^{137}$Cs having become prominent can be obtained. If only a peak of 662 keV is present in the spectrum of FIG. 2, the task of subtraction is easy, and thereby the component due to $^{137}$Cs can be removed from the spectrum of FIG. 1. However, in the spectrum of FIG. 2, in addition to the peak, there are observed such disturbing components as described above (low-energy-side disturbing component and high-energy-side disturbing component), and the disturbing components vary depending on various conditions and an environment of the measurement. Accordingly, it is general that the disturbing components appearing in practice in a result of measurement performed under an actual environment (corresponding to FIG. 1) are different from the disturbing components in the spectrum of FIG. 2 measured on a reference sample under a different environment.

Among the disturbing components, the high-energy-side disturbing component includes a portion generated by the pile-up and sum effect of γ-rays emitted by $^{137}$Cs, as described above. Specifically, the disturbing component becomes prominent when the count of γ-rays emitted by $^{137}$Cs (total detection number) per unit time is large. In the radiation detector used here, a scintillator and a photomultiplier tube are used, as described before, where what is detected is pulsed light that is emitted when γ-rays are absorbed by the scintillator, and the total detection number depends on the size of the scintillator and increases with increasing the scintillator size. Accordingly, when the scintillator is large, intensity of a peak due to a nuclide to be measured is high in the spectrum, but at the same time the high-energy-side disturbing component is large. When the scintillator is small, in contrast, intensity of the peak due to a nuclide to be measured is low, but at the same time the high-energy-side disturbing component is small, and even may be made to be at a negligible level. That is, by varying the size of the scintillator, influence of the high-energy-side disturbing component can be controlled particularly.

The low-energy-side disturbing component in FIG. 2 includes γ-rays (X-rays) generated by Compton effect or the like due to γ-rays emitted by $^{137}$Cs and having a lower energy than that of the γ-rays emitted by $^{137}$Cs. This component is more easily absorbed (its absorption coefficient in substance is higher) than γ-rays emitted by $^{137}$Cs and the high-energy-side disturbing component, and accordingly can be reduced by using a shield. That is, by varying the degree of absorption by varying the thickness of the shield, influence of the low-energy-side disturbing component can be controlled particularly In the above description, simplification has been made to assume that the high-energy-side disturbing component in FIG. 2 is dependent on the size of the scintillator, and the low-energy-side disturbing component is on the thickness of the shield, but in practice the high-energy-side and low-energy-side disturbing components each are affected by both the scintillator size and the shield thickness. Accordingly, it is possible to reproduce components to subtract from the spectrum of FIG. 1 (background nuclide-originating components), from spectra measured by varying the scintillator size and the shield thickness in the measurement on a reference source ($^{137}$Cs source) composed of $^{137}$Cs, which is a nuclide (background nuclide) whose influence is dominant in such measured spectra (corresponding to FIG. 1). The background nuclide-originating components include not only that due to the 662 keV γ-rays emitted by $^{137}$Cs itself, but also that caused by the pile-up and sum effect due to the measurement as described above.

In such a case as that described above where the high-energy-side disturbing component and the low-energy-side disturbing component in the spectrum measured on a sample (measured spectrum) both originate from $^{137}$Cs, it is obvious that detected intensity of the high-energy-side disturbing component and that of the low-energy-side disturbing component are correlated with detected intensity (peak intensity) of the monochromatic γ-rays at 662 keV emitted by $^{137}$Cs. In that case, when the above-described reference source ($^{137}$Cs source) is measured by the same radiation detector as that used for measuring the sample, under various conditions yielding different detected intensities, thus obtaining a measurement result (reference spectrum) for each condition, any of the reference spectra includes the peak at 662 keV, the high-energy-side disturbing component, and the low-energy-side disturbing component. Among the reference spectra, one in which the peak at 662 keV, which is to reflect $^{137}$Cs most significantly, has a form closest to that of the peak at 662 keV in the spectrum of the sample (measured spectrum) can be estimated to best represent the components originating from $^{137}$Cs included in the measured spectrum. That is, such a reference spectrum may be determined to be a background nuclide-originating component. Such parameters bringing about results with different detection intensities when obtaining the reference spectra include the above-described scintillator size and shield thickness, while the distance between the radiation detector and the reference source may be used in the simplest case of such a parameter.

Figure 3:
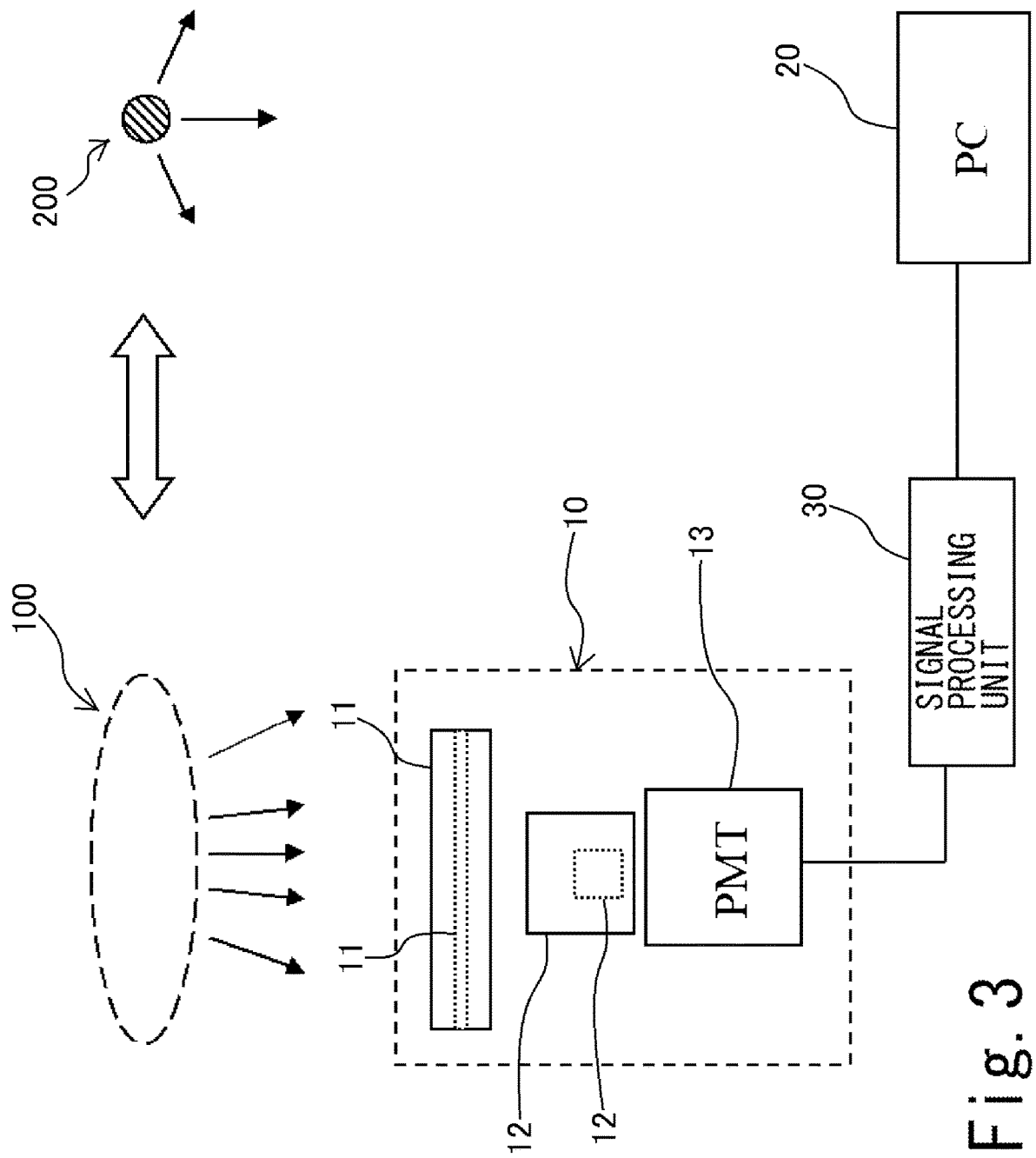
FIG. 3 is a diagram schematically showing an entire measurement system for implementing a radiation analysis method according to the present invention.

FIG. 3 schematically illustrates an entire measurement system for implementing the radiation analysis method described above. In this configuration, there are used a radiation detector 10 for detecting γ-rays, and a computer (calculation unit) 20 for recognizing a measurement result (γ-ray energy spectrum: spectrum) of the radiation detector 10, performing various kinds of mathematic operations using the recognized measurement result, and thereby calculating a background-nuclide-originating component described above and further calculating a spectrum obtained by subtracting the background-nuclide-originating component from a measured spectrum. In the radiation detector 10, a combination of a shield 11, a scintillator 12, and a photomultiplier tube (photodetector) 13 is used, where a plurality of shields 11 having different thicknesses are selectively used, one at one time, and, as the scintillator 12, the ones made of the same material but having different sizes (different in thickness in the optical-axis direction, or in width in a direction perpendicular to the optical-axis direction) are used. The shield 11 is made of, for example, heavy metal (W or the like), its thickness is set in a range of causing significant variation between measured spectra (detected γ-ray intensities), and is appropriately set depending on intensity of radiation (γ-rays) emitted by a sample 100. Details of the scintillator 12 and of the photomultiplier tube 13 will be described later. Pulsed voltage outputs are issued from the photomultiplier tube 13, as described before, and, for processing the outputs, the output signals are AD converted at a short time interval (for example, 2 ns or less) in a signal processing unit 30 and recognized as digital signals in the computer 20

Using the radiation detector 10, a spectrum of γ-rays emitted by the sample 100 or a reference source 200 is obtained for each of the scintillators 12 having different sizes and for each of the shields 11 having different thicknesses, then stored in a hard disk, a non-volatile memory, or the like in the computer 20, and then used for the operations. Here, the reference source 200 is a source composed of the above-described background nuclide, which has been described to be $^{137}$Cs in the above case, but is set depending on the sample 100 in practice. The background nuclide is a nuclide to yield the most prominent peak appearing in a spectrum of a sample measured by the radiation detector 10 as that shown in FIG. 1, and may be $^{60}$Co, besides $^{137}$Cs, when the sample 100 is present in a nuclear reactor environment, for example.

Figure 4:
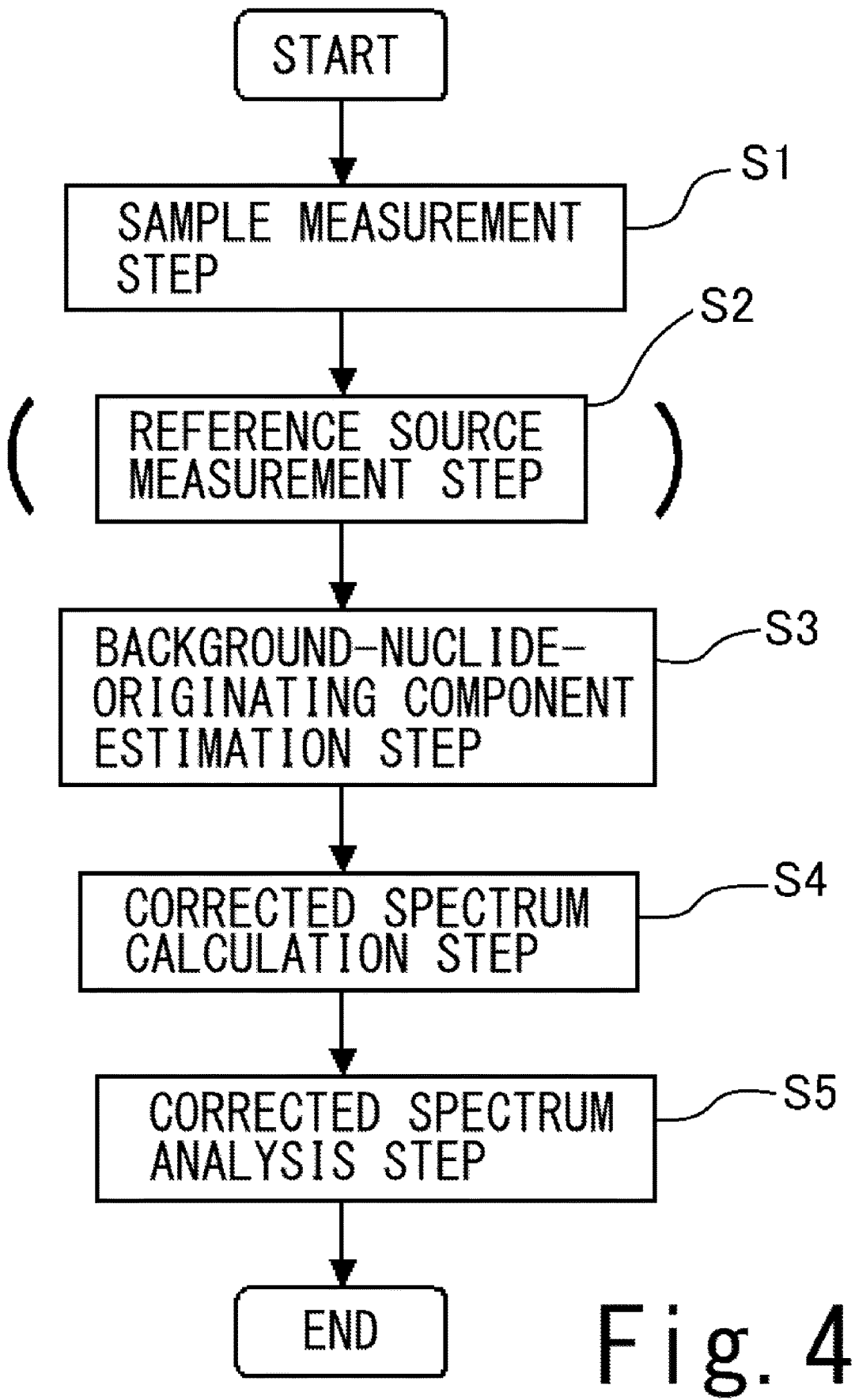
FIG. 4 is a flowchart illustrating the radiation analysis method according to the present invention.

FIG. 4 is a flowchart illustrating the radiation analysis method executed using the above-described configuration. In the radiation analysis method, first, a spectrum (measured spectrum) of the sample 100 as that shown in FIG. 1 is measured by the radiation detector 10 (sample measurement step: S1). There, as described above, a plurality of scintillators different in size are used as the scintillator 12, a plurality of shields different in thickness are used as the shield 11, and a measured spectrum is obtained for each of the conditions (setting conditions), which is then stored in the computer 20. FIG. 1 corresponds to one example of such a measured spectrum.

Next, similar measurement is performed on the reference source 200 (reference source measurement step: S2), and a spectrum (reference spectrum) obtained for each setting condition is stored in the computer 20. Here, as the nuclide (background nuclide) selected for the reference source 200, a most dominant nuclide in the measured spectra having been obtained in the sample measurement step can be selected. When the background nuclide is known in advance, the reference source measurement step may be performed before the sample measurement step. In such a case, thus measured reference spectra can be commonly used for measuring different samples 100, that is, the step need not be performed each time a different sample 100 is used. FIG. 2 corresponds to one example of such a reference spectrum.

Figure 5:
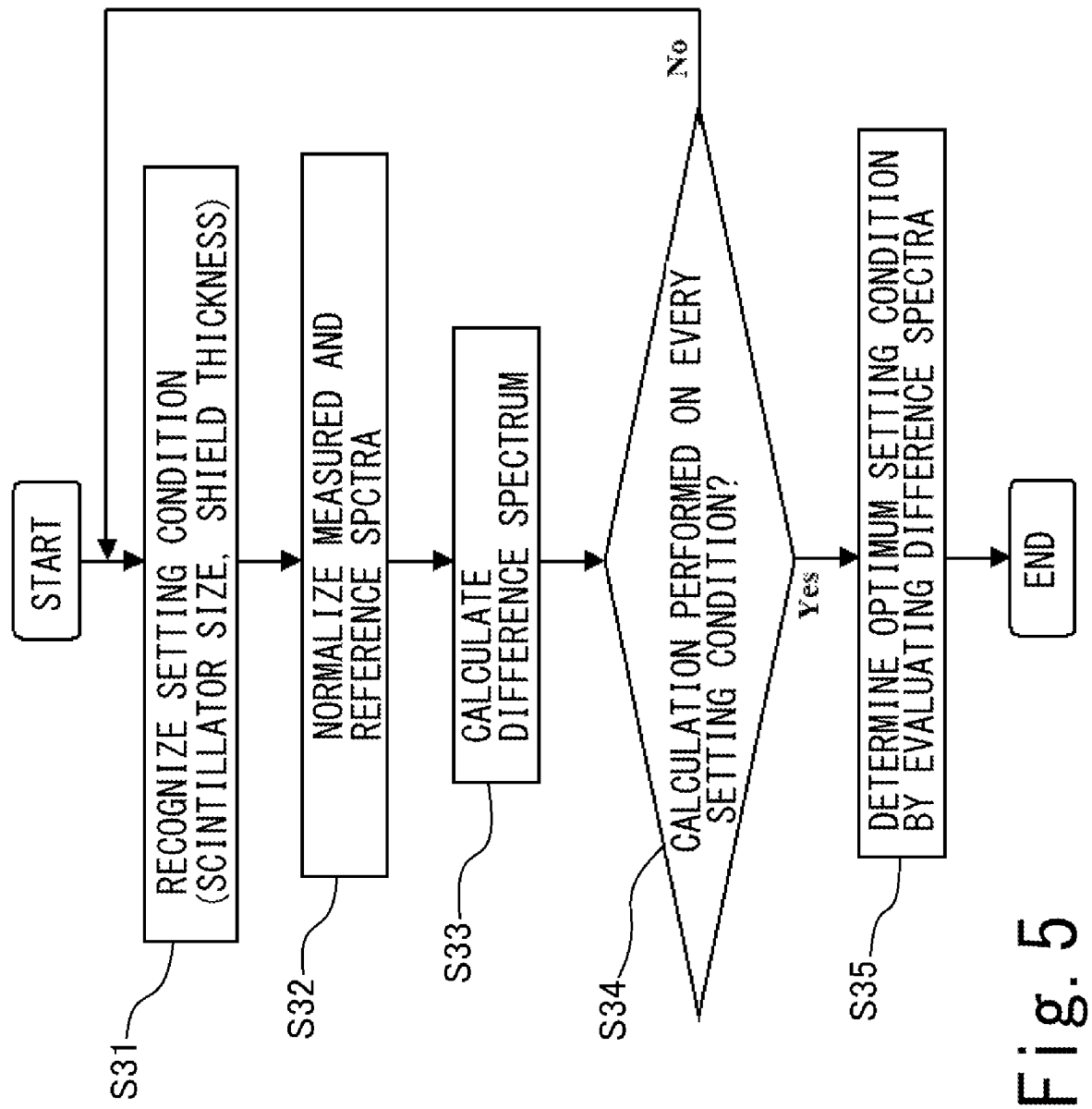
FIG. 5 is a flowchart illustrating an example of a background nuclide-originating component estimation step in the radiation analysis method according to the present invention.

Next, from the reference spectra obtained in the reference source measurement step (S2), a background nuclide-originating component, which is a component originating from the background nuclide ($^{137}$Cs) in a measured spectrum as that illustrated in FIG. 1, is estimated as described above (background nuclide-originating component estimation step: S3). The background nuclide-originating component includes, as described above, not only a peak corresponding to monochromatic γ-rays emitted by $^{137}$Cs at 662 keV, but also the disturbing components described above. As an estimation method for this purpose, various methods may be selected FIG. 5 is a flowchart illustrating an example of such a method. Mathematic operations for the method are performed by the computer 20. Here, sizes of the scintillator 12 and thicknesses of the shield 11 are determined as the above-described setting conditions of the radiation detector 10, and analysis is performed for each of the setting conditions. First, one of the setting conditions (a combination of a size of the scintillator 12 and a thickness of the shield 11) is set (S31). From among the measured spectra and the reference spectra, respectively, ones measured under the setting condition are selected, which are subsequently normalized to enable them to correspond to each other. A variety of methods are used for the normalization, where, for example, the normalization is performed such that intensity of the peak at 662 keV corresponding to $^{137}$Cs be the same in both of the spectra (that is, the difference be zero at the peak energy) (S32). Subsequently, a spectrum of the difference between the normalized spectra (difference spectrum) is calculated (S33) and stored in the computer 20. This task is performed until such a difference spectrum is obtained for every condition (Yes at S34).

Next, it is identified which one of the setting conditions (the size of the scintillator 12 and the thickness of the shield body 11) has given a difference spectrum that is most appropriate (S35). A criterion for determination in the identification may also be set as appropriate. For example, when the sum effect affects much in the spectra, it is considered to select a spectrum having a smallest amount of component corresponding to the sum effect, to select a case where a peak corresponding to the r-ray energy of a nuclide to be identified is obtained with a highest contrast, or the like.

Thus, a setting condition (the size of the scintillator 12, the thickness of the shield 11) in accordance with the background nuclide-originating component is determined, and a reference spectrum corresponding to the condition is identified. However, this reference spectrum is a result of actual measurement, similarly to the measured spectra, and accordingly has a large statistical error, in general. Therefore, it is desirable, from this reference spectrum, either to select a background nuclide-originating component that is estimated to be most likely, or to construct an interpolated spectrum. For this purpose, for example, by using modeling of the vicinity of a peak such as that described in G F Knoll, "Radiation Detection and Measurement" (Wiley), Chapter 10 (Radiation Spectroscopy with Scintillators), and comparing results obtained by thus fitting the measured results and the reference spectra, respectively, a most likely reference spectrum or interpolated spectrum may be determined to be a background nuclide-originating component. There, for example, it is possible to use a result obtained by approximating the peak at 662 keV by a Gaussian distribution, obtaining a spectrum by adding to thus approximated peak a linear component with respect to energy, and fitting thus obtained spectrum to a reference spectrum by the least squares method. Such modeling may be appropriately set in accordance with the shape of a reference spectrum. Thus obtaining such a result by fitting may be performed in the stage of calculating a difference spectrum described above (S33).

In the background nuclide-originating component estimation step (S3), a background nuclide-originating component may also be estimated without using the reference spectra obtained for respective setting conditions in the reference source measurement step (S2), but using only the measured spectra obtained for respective setting conditions in the sample measurement step (S1). This procedure is particularly effective when the number of setting conditions (the number of kinds of used scintillators 12 and shields 11) is large. In this procedure, by calculating a plurality of differences between the measured spectra for respective setting conditions, the differences each being, for example, the difference between measured spectra respectively corresponding to two kinds of scintillators 12 different in size, it is possible to estimate a background nuclide-originating component in the case of a scintillator 12 with a certain size. Such a way of estimation is effective particularly when the reference spectrum can be approximated with high accuracy by the above-described model. It is equivalent to estimating a reference spectrum by obtaining a large number of differences between the measured spectra for different setting conditions instead of obtaining the above-described reference spectra by actual measurement. In this procedure, the reference source measurement step (S2) is not required, which enables reduction of time required for the measurement.

Figure 6:
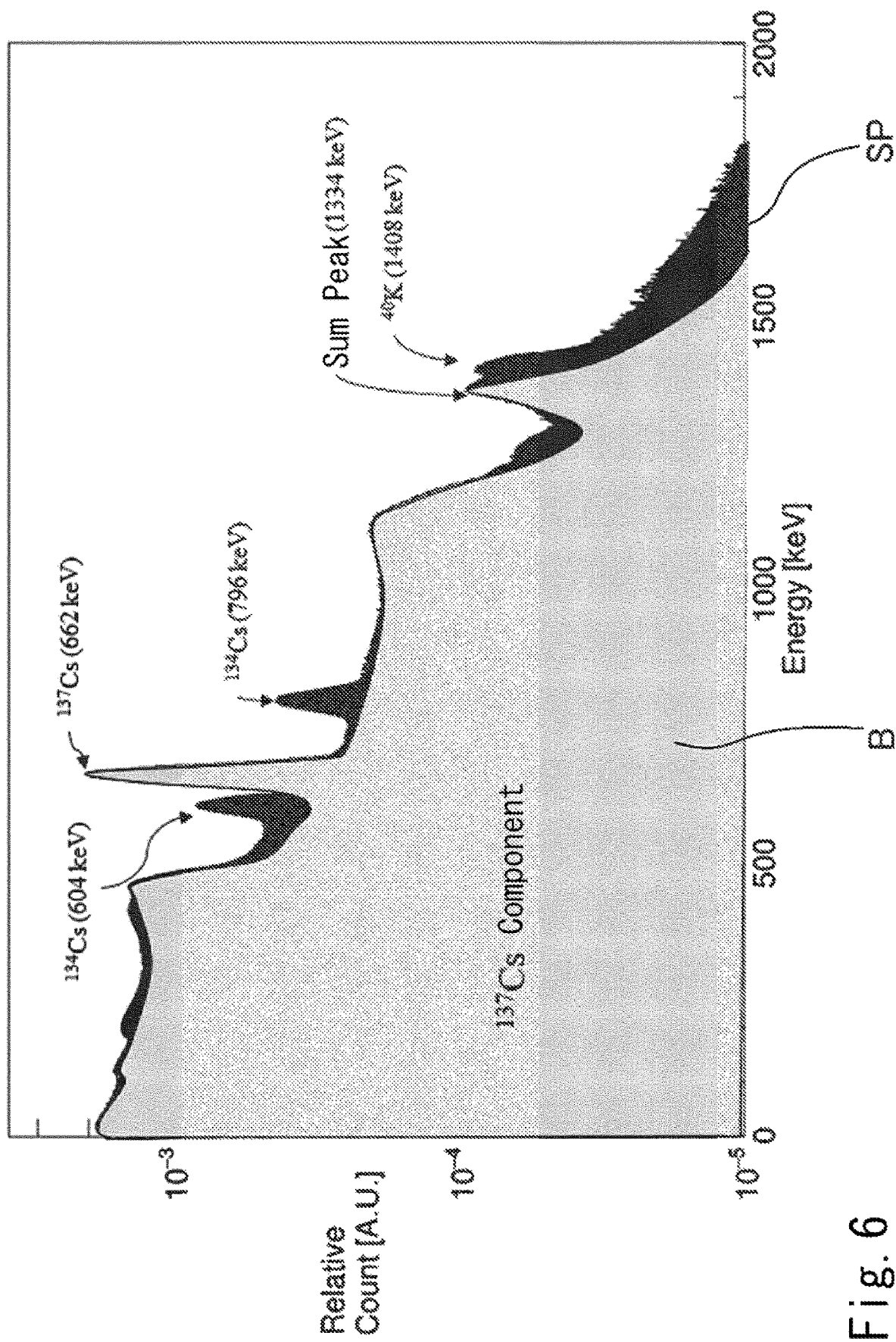
FIG. 6 shows an example of a background nuclide-induced component and a corrected spectrum calculated in the radiation analysis method according to the present invention.

Next, as shown in FIG. 4, a corrected spectrum corresponding to the difference between the measured spectrum and the background nuclide-originating component is calculated (corrected spectrum calculation step: S4). FIG. 6 shows such a background nuclide-induced component B and a corrected spectrum SP when the result of FIG. 1 is assumed to be the measured spectrum. In this corrected spectrum, the component due to $^{137}$Cs is reduced, so that peaks of γ-rays emitted by other nuclides ($^{134}$Cs and $^{40}$K in FIG. 6) become clear. Therefore, by analyzing the corrected spectrum, composition analysis or the like of the other nuclides can be performed (corrected spectrum analysis step: S5).

In the above-described example, the size of the scintillator 12 and the thickness of the shield 11 are specified as the setting conditions in the radiation detector 10. There, the shield 11 acts as a filter to cut the low energy side, so that its thickness affects the form of spectrum. Further, the material of the shield 11 affects generation of characteristic X-rays, and accordingly the shield may be constructed to have a laminated structure with its layers having different thicknesses and materials. However, when low-energy photons are excluded from targets to measure, the above-described measurement may be performed without varying the structure of the shield 11 but setting it constant (or without using the shield 11), and varying only the size of the scintillator 12. It has been described above that a plurality of thicknesses are set for the shield 11 in order to vary the degree of radiation absorption, but alternatively a plurality of materials may be set for the shield 11 for the same purpose. The radiation detector 10 recognizes energy of each γ-ray photon it detected. In the use described here, the above-described combination of the scintillator 12 and the photomultiplier tube 13 is particularly preferred. However, alternatively, a photodetector capable of recognizing energy of each γ-ray photon it detected, similarly to the photomultiplier tube 13, may be used.

In the corrected spectrum analysis step (S5), instead of the nuclide composition analysis, another analysis may be performed. Also in that case, influence of abundantly present $^{137}$Cs can be reduced by using the corrected spectrum described above. While the background nuclide has been assumed to be $^{137}$Cs in the above-described example, the same effect can be obtained also when the background nuclide is assumed to be another one, such as $^{60}$Co, depending on the situation. Further, while γ-rays are detected and their energy spectrum is obtained in the above-described example, the above-described method may be similarly employed when a sample analysis is performed using an energy spectrum of another kind of radiation, such as neutrons, wherein influence of a specific nuclide is large.

In the flowchart of FIG. 5, the size of the scintillator 12 and the thickness of the shield 11 are determined as setting conditions. As described before, in the reference source measurement step (S2), measurement results obtained under a plurality of conditions to enable measured intensity of the reference source ($^{137}$Cs) by the radiation detector 10 to be different between different conditions may be used as reference spectra. A practical procedure in such a case, which is in accordance with the flowchart of FIG. 4, will be described below.

In this case, in the sample measurement step (S1), a result of measurement performed with a certain setting on the side of the radiation detector 10 (the size of the scintillator 12 and the thickness of the shield 11) may be used as the measured spectrum.

Next, in the reference source measurement step (S2), reference spectra are obtained by measuring the reference source 200 (background nuclide $^{137}$Cs) under a plurality of conditions (setting conditions) enabling intensities measured by the radiation detector 10 to be different between the conditions. As described above, the distance between the reference source 200 and the radiation detector 10 may be determined as the setting condition in the present case. That is, in the reference source measurement step (S2), by performing the measurement a plurality of times, in which the distance between the reference source 200 and the radiation detector 10 is varied between the times, a plurality of reference spectra corresponding to the respective times are obtained.

Figure 7:
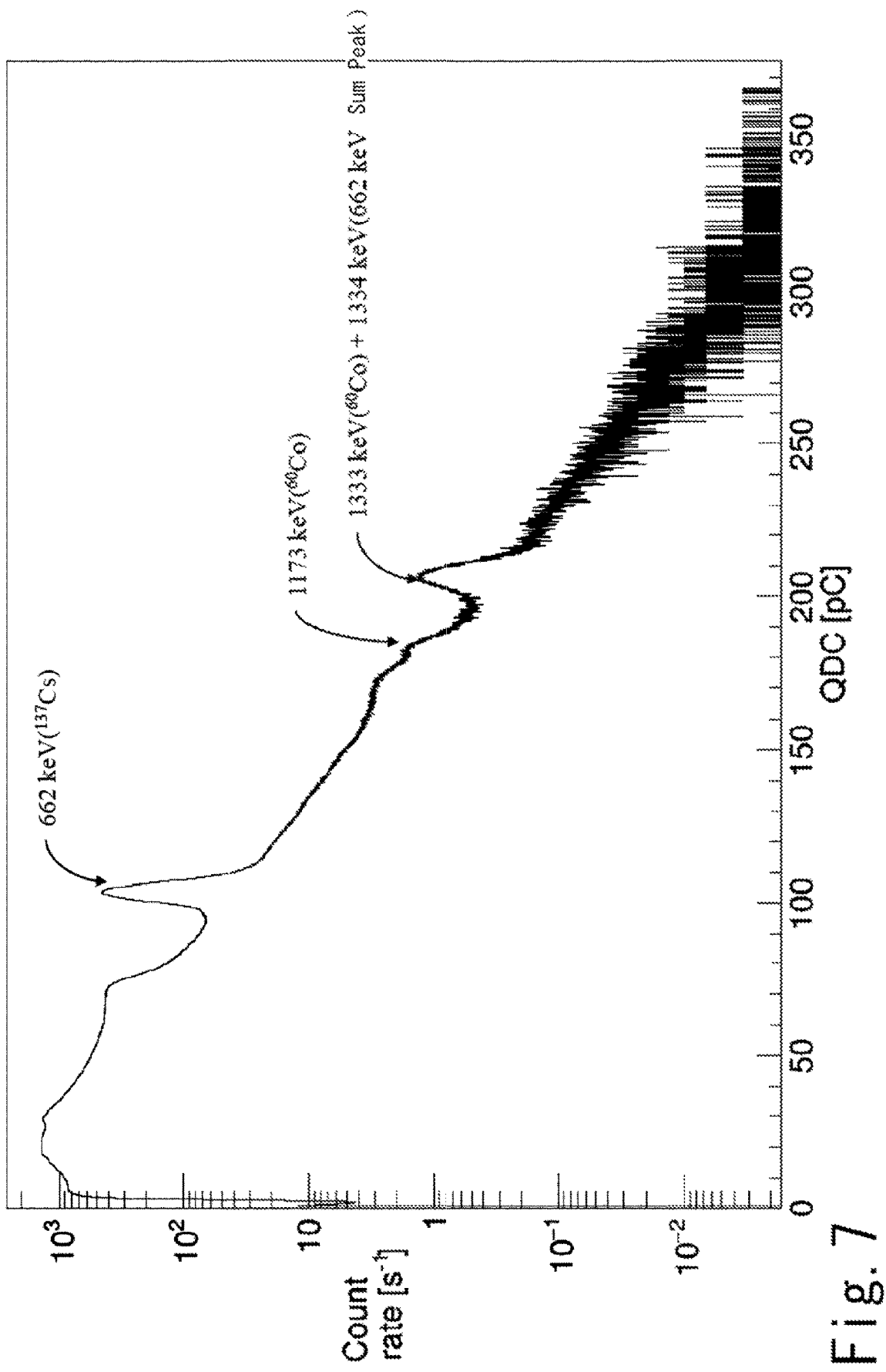
FIG. 7 shows a measured spectrum obtained in the radiation analysis method according to an example.

Next, in the background nuclide-originating component estimation step (S3), a form around the 662 keV peak in the measured spectrum is compared with that in each of the reference spectra, and one of the reference spectra whose form around the peak of 662 keV is closest to (is least different from) that in the measured spectrum may be estimated to be a background nuclide-originating component. Subsequently, as in the above-described example, the corrected spectrum calculation step (S4) for obtaining a corrected spectrum from the difference between the measured spectrum and the background nuclide-originating component is performed, and then the corrected spectrum analysis step (S5) is performed A result practically obtained in the present case will be described below. While the case of measuring $^{40}$K under presence of $^{137}$Cs has been described in the above-described example, here is described a case of measuring $^{60}$Co under presence of $^{137}$Cs (background nuclide). FIG. 7 shows the measured spectrum (S1 in FIG. 4) obtained in the present case. There, the horizontal axis represents the channel number (corresponding to the γ-ray energy), and energies of identified peaks are noted. Since the present background nuclide is $^{137}$Cs, the peak of 662 keV is similar to that in the example described above. $^{60}$Co has a peak at 1333 keV, which substantially overlaps with a sum peak of $^{137}$Cs (1334 keV).

Figure 8:
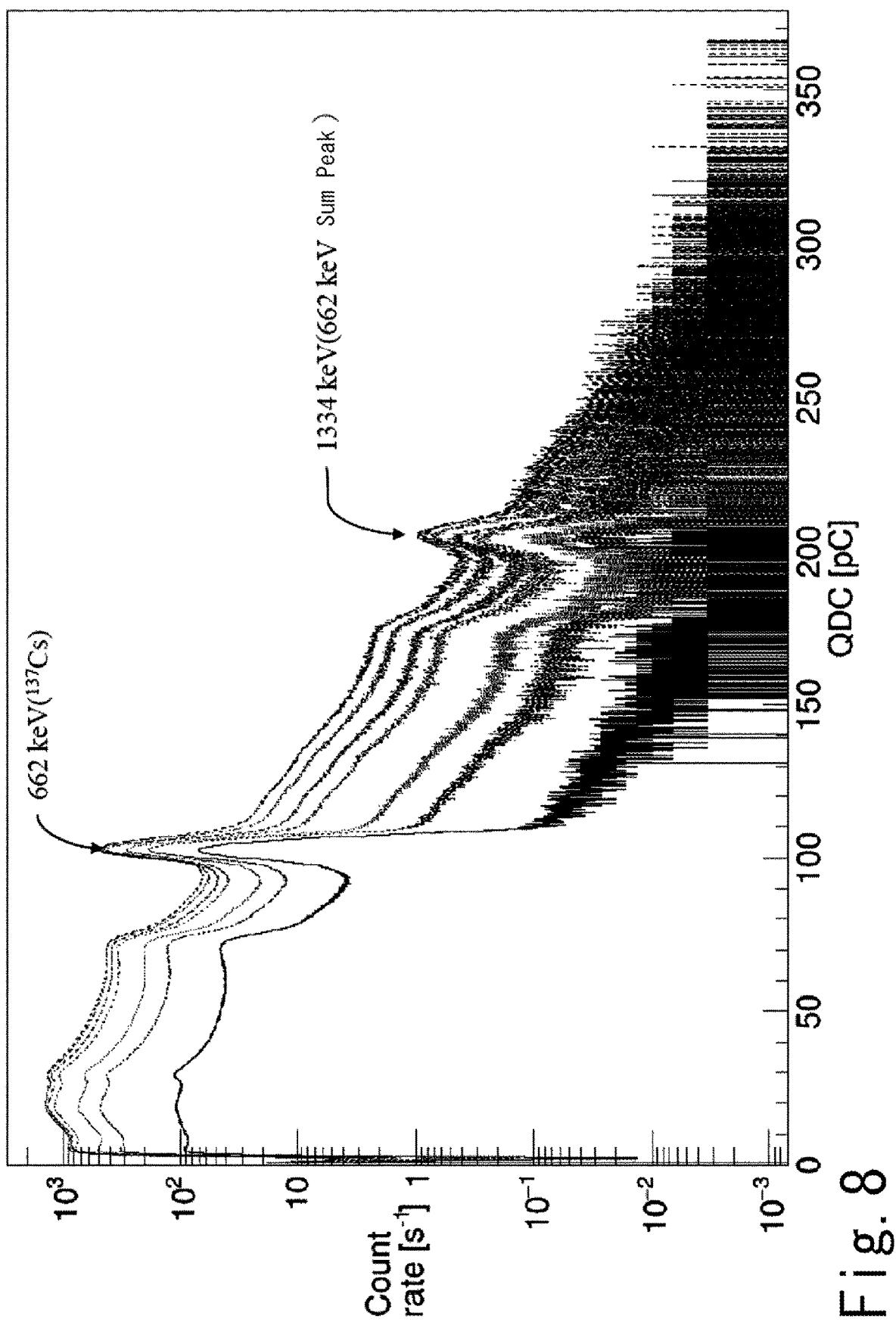
FIG. 8 shows reference spectra obtained in the radiation analysis method according to the example.

Next, reference spectra obtained by measurement on the background nuclide ($^{137}$Cs), varying the distance as described above, (S2 in FIG. 4) are shown in FIG. 8. There, the distance (setting condition) is set at seven different values, and components originating from $^{137}$Cs (the peak at 662 keV, a sum peak related to it, and in addition, a low-energy-side disturbing component and a high-energy-side disturbing component) are observed, as described before. Comparing each of the reference spectra with the measured spectrum (FIG. 7) in terms of the form around the peak at 662 keV, the second uppermost reference spectrum in FIG. 8 was found to have a least difference from the measured spectrum. Accordingly, this reference spectrum was estimated to represent the background nuclide-originating component (S3 in FIG. 4).

Figure 9A:
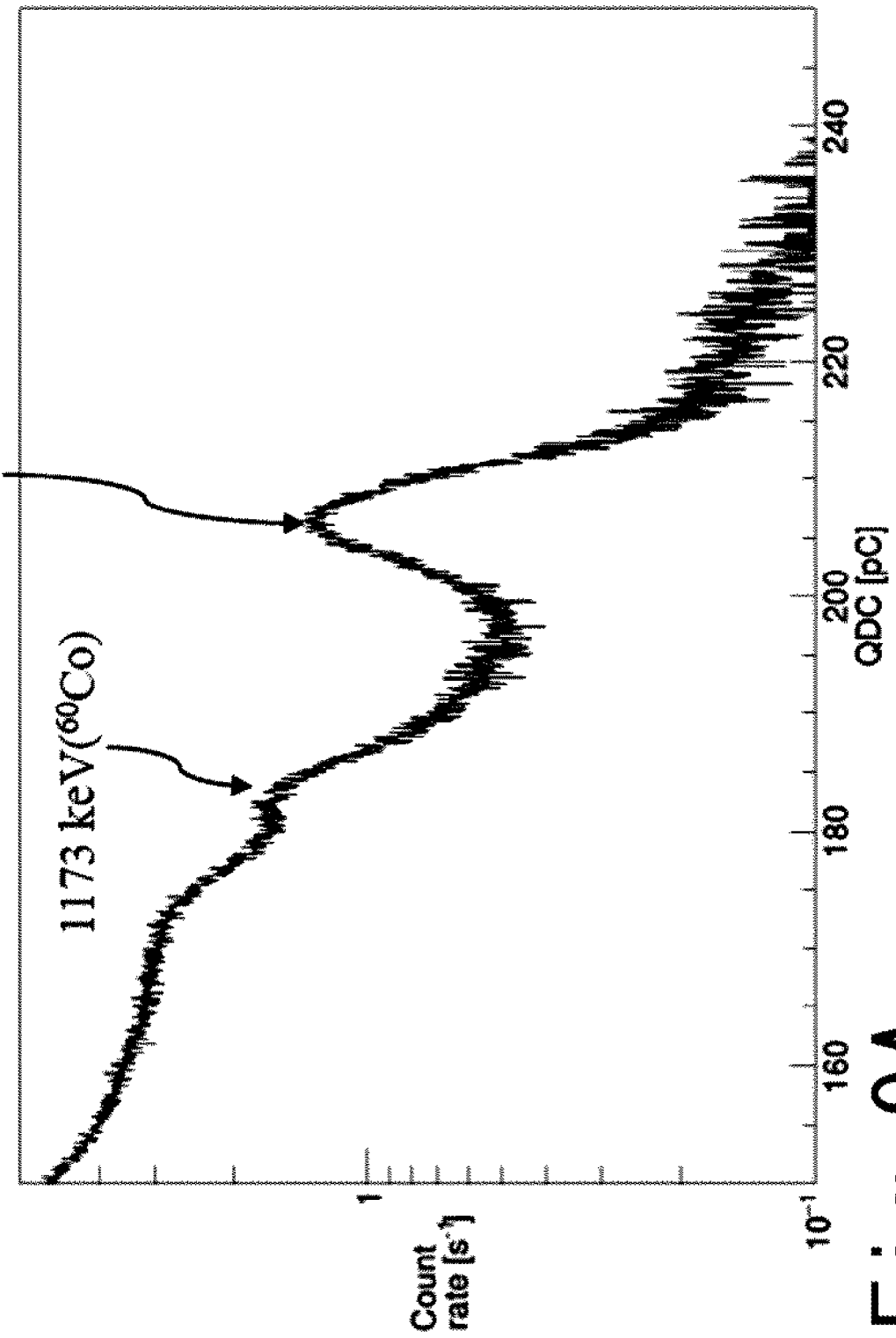
FIG. 9A shows a form around peaks of $^{60}$Co in a measured spectrum obtained in the radiation analysis method according to the example.
Figure 9B:
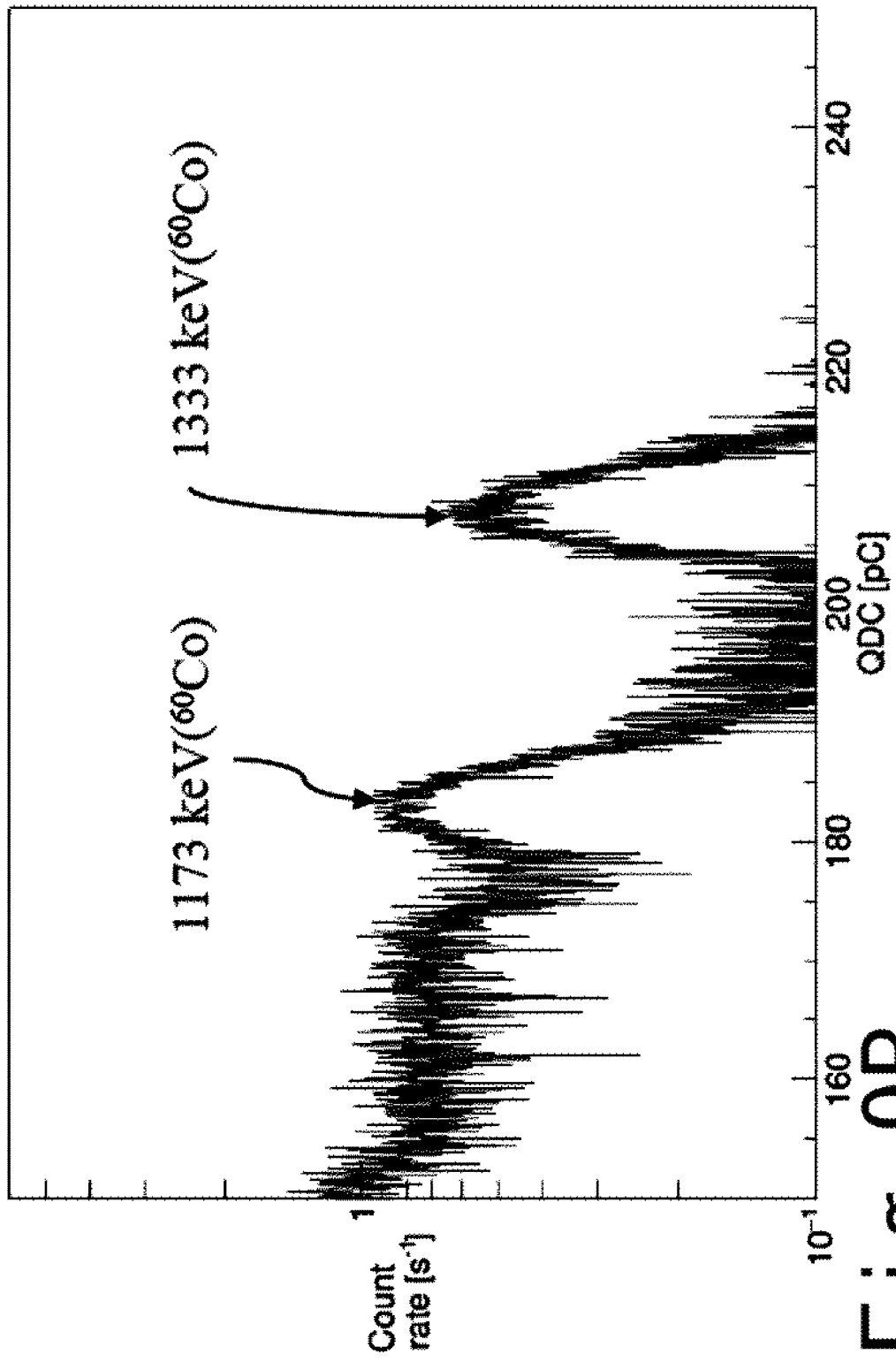
FIG. 9B is a corrected spectrum corresponding to the form around peaks of $^{60}$Co in the measured spectrum obtained in the radiation analysis method according to the example.

FIG. 9A shows an enlarged view of the form around 1333 keV in FIG. 7, and FIG. 9B shows a corrected spectrum in the same energy range calculated using the estimated background nuclide-originating component (S4 in FIG. 4). In the corrected spectrum, peaks of $^{60}$Co (1333 keV, 1173 keV) became clear. That is, the peaks of $^{60}$Co that is the target of the measurement is clearly obtained by the radiation analysis method described above.

Next, a configuration of the radiation detector 10 particularly preferably used in the above-described radiation analysis method will be described. As already described, in the radiation detector 10, the scintillator 12 and the photomultiplier tube 13 are used in combination.

First, a description will be given of a material constituting the scintillator 12. Preferably, the material has a high density, for absorbing γ-rays, a short decay time of light emission, for making pile-up or the like less likely to occur, and low self-radioactivity, and enables obtaining high energy resolution. Materials satisfying these requirements include CeBr$_3$ (emission wavelength: 370 nm, decay time: 19 ns, density: 5.1 g/cm$^3$) and Ce-doped LaBr$_3$ (emission wavelength: 380 nm, decay time: 16 ns, density 5.3 g/cm$^3$). The size of the scintillator 12 is set at a plurality of different ones, as already described, and may be set to be, for example, a cube whose edge length is in a range from 4 to 15 mm.

Figure 10:
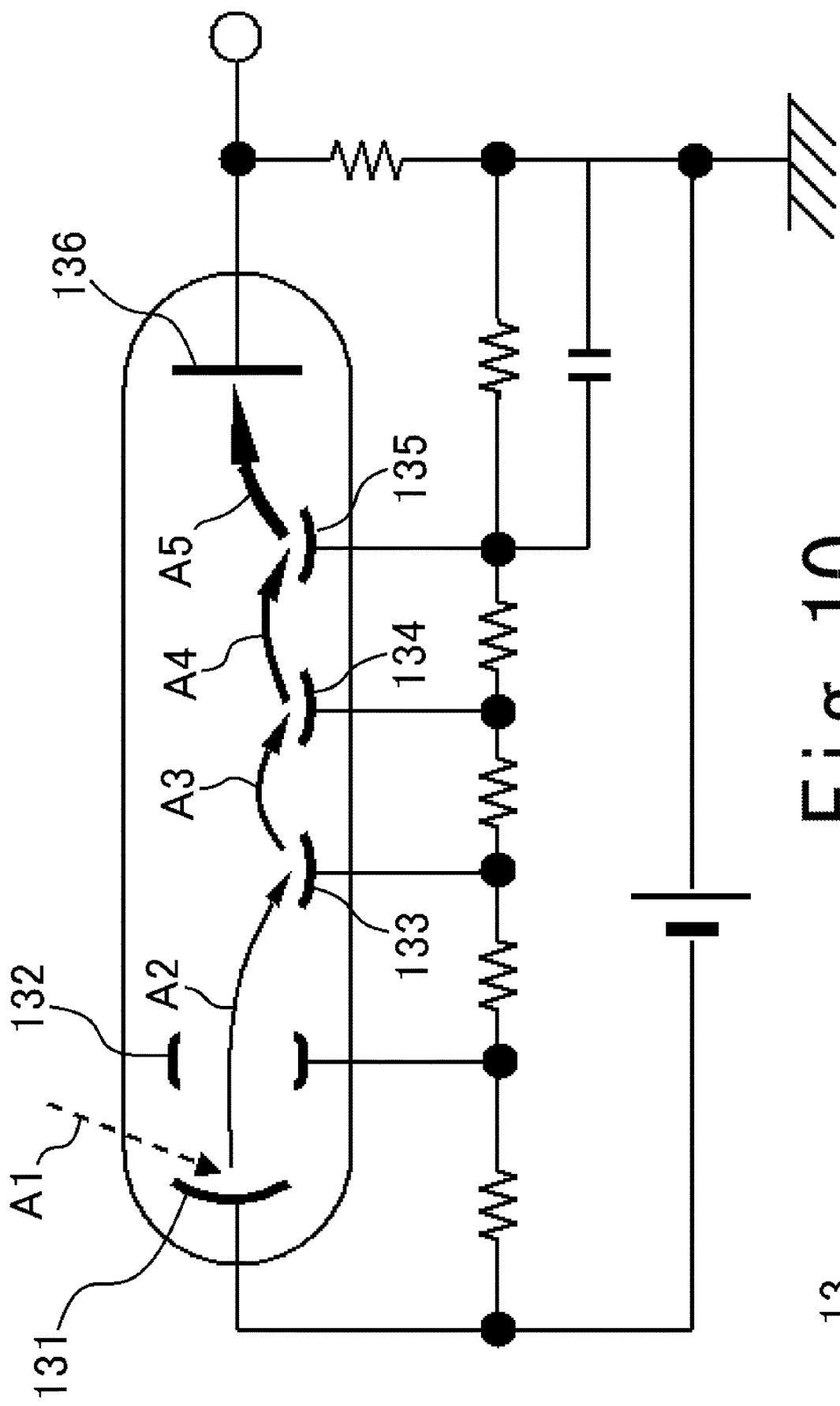
FIG. 10 is a diagram schematically showing a configuration of a photomultiplier tube.

Meanwhile, in the background nuclide-originating component estimation step (S3) in FIG. 4, in both the case of using reference spectra and the case of using only measured spectra, the task of comparing between spectra (calculating the difference) is performed. There, it is required that the scale of energy represented by the horizontal axis of the spectra of FIGS. 1 and 2 is the same for all the spectra to be compared. On the other hand, since the spectra respectively correspond to different setting conditions, absolute values of γ-ray intensity (detection number per unit time) in the spectra are different between the spectra. The energy corresponds to intensity of current that is output after being multiplied in the photomultiplier tube 13, according to pulsed light having entered the photomultiplier tube 13. In general, in contrast to that intensity of pulsed light emitted from the scintillator 12 (the charge amount of the pulse or its waveform integral) is proportional to energy of an absorbed γ-ray, there is not necessarily a good proportional relation, in the photomultiplier tube 13, between intensity of pulsed light and intensity of output current, as will be described below, in which case there occurs variation in the scale of energy between such spectra as described above, and as a result, the above-described analysis cannot be performed practically FIG. 10 is a diagram showing a structure of the photomultiplier tube 13 and its driving circuit, in a simplified manner. In the diagram, since the configuration is shown in the simplified manner, forms of constituents and positional relations between them are different from practical ones, to be precise. Further, while only three dynodes are used in the present example, more dynodes are provided practically. In the photomultiplier tube 13, when pulsed light (visible light) is incident from the scintillator 12 as indicated by an arrow A1, electrons (photoelectrons) are emitted in numbers proportional to intensity of the light, by photoelectric conversion at a photoelectric surface (not shown) on the side of a cathode 131 in the vacuum. The electrons are focused by a focus grid 132 as indicated by an arrow A2 and thereby become incident on the dynode 133, by which more electrons are generated and flow into a dynode 134 at the following stage. Such electron multiplication is similarly performed also at dynodes 134 and 135, and electrons thus sequentially multiplied as indicated by arrows A3, A4, and A5 finally flow into an anode 136. There, rates of the multiplication between adjacent dynodes each depend on a voltage difference between the adjacent dynodes.

Here, practically in the photomultiplier tube 13, a DC voltage is applied between the cathode 131 and the anode 136, where the DC voltage is divided into portions that are respectively applied between the dynodes. On the other hand, as a result of the multiplication, the flow of electrons (electric current) indicated by the arrows A2 to A5 in FIG. 10 become more larger at more later stages. For example, Japanese Patent Applications Laid-open No. 1995-142024, No. 1998-208688 and No. 2010-54364 describe that, in such a case, as a result of the increase in current flowing between adjacent dynodes (or between the anode and the adjacent dynode) at more later stages, a voltage (its absolute value) applied between adjacent dynodes (or between the anode and the adjacent dynode) becomes more lower (thus varies) at a more later stage.

The voltage is generated by division of a voltage of a DC power supply as described above, and accordingly, when it becomes lower at a later stage, a potential difference (its absolute value) between dynodes at the preceding stage is increased. This causes increase in the multiplication rate at the preceding stage, and as a result, since the multiplication rate at a more earlier stage contributes more to the final electron multiplication rate of the photomultiplier tube 13, the final electron multiplication rate is increased, compared to that of when such voltage variation does not occur. There, in the photomultiplier tube 13, there is not a proportional relation between the intensity of pulsed light and the intensity of output current, where the intensity of output current becomes higher than in the case with a proportional relation.

Japanese Patent Applications Laid-open No. 1995-142024, No. 1998-208688 and No. 2010-54364 each describe a means for suppressing the decrease of a voltage applied between the anode 136 and the adjacent dynode 135 (final stage dynode) caused by the increase of current flowing between the anode and the dynode at a time of detecting light in the above-described way. The voltage decrease caused by the current increase is suppressed by connecting an auxiliary DC power supply to a later-stage dynode in a technology described in the first one of the Japanese Patent Applications Laid-open, by using a Cockcroft-Walton circuit in the second one, and by using a circuit having a transistor connected to each dynode in the third one.

It is particularly preferable to use a photomultiplier tube 13 provided with a means for suppressing voltage variation such as described above. However, when the linearity in output described above can be maintained without such a means for suppressing voltage variation, no such means need to be used.

REFERENCE SIGNS LIST 10 radiation detector
11 shield
12 scintillator
13 photomultiplier tube
20 computer (calculation unit)
30 signal processing unit
100 sample
131 cathode
132 focus grid
133 to 135 dynode
136 anode
200 reference source

The invention claimed is:

1. A radiation analysis method for identifying a plurality of kinds of radioactive nuclides simultaneously contained in a sample by measuring an energy spectrum of radiation emitted from the sample,
the radiation analysis method including:
defining a plurality of conditions that yield different detection intensities on a same measurement target as setting conditions, in a radiation detector for detecting the radiation;
a sample measurement step of obtaining a measured spectrum that is an energy spectrum measured on the sample by the radiation detector;
a background nuclide-originating component estimation step of estimating a background nuclide-originating component that is a component originating from a background nuclide corresponding to one of the nuclides having a largest contribution to the radiation, from results obtained by performing the measurement by the radiation detector under respective ones of the setting conditions;
a corrected spectrum calculation step of calculating a corrected spectrum by subtracting the background nuclide-originating component from the measured spectrum; and
performing analysis of the sample using the corrected spectrum.

2. The radiation analysis method according to claim 1, including:
a reference source measurement step of obtaining reference spectra that each are an energy spectrum obtained by measuring radiation emitted from a reference source composed of the background nuclide, under respective ones of the setting conditions; and
estimating the background nuclide-originating component, in the background nuclide-originating component estimation step, by comparing the reference spectra with the measured spectra.

3. The radiation analysis method according to claim 2, wherein setting of a distance between the radiation detector and the reference source in the reference source measurement step is included in the setting conditions.

4. The radiation analysis method according to claim 1,
wherein a plurality of shields for absorbing, and thereby limiting at different degrees, the radiation entering the radiation detector are selectively provided in the radiation detector, one at one time, and the selection among the shields is included in the setting conditions.

5. The radiation analysis method according to claim 1,
wherein the radiation detector includes a scintillator that emits light by absorbing the radiation and a photodetector that detects the light,
wherein the scintillators having different sizes are selectively used, any one of them at one time, and
the selection of a size of the scintillator is included in the setting conditions.

6. The radiation analysis method according to claim 5, wherein the photodetector is a photomultiplier tube.

7. The radiation analysis method according to claim 6,
wherein the photomultiplier tube includes a cathode, an anode, and a plurality of dynodes between the cathode and the anode, and
wherein the photomultiplier tube is provided with a voltage variation suppressing means for suppressing variation in a voltage applied between the anode and a last stage dynode that is the dynode adjacent to the anode, the variation being caused by increase in current flowing between the anode and the last stage dynode at a time of detecting the light.

8. The radiation analysis method according to claim 7,
wherein the voltage variation suppressing means suppresses variation in a voltage applied between the last stage dynode and the dynode adjacent to the last stage dynode, the variation being caused by increase in current flowing between the last stage dynode and the dynode adjacent to the last stage dynode.

9. The radiation analysis method according to claim 1,
wherein the background nuclide is $^{137}Cs$ or $^{60}Co$.

10. A radiation analysis device for executing the radiation analysis method according to claim 1,
the radiation analysis device including a calculation unit that calculates the background nuclide-originating component by executing the background nuclide-originating component estimation step, and calculates the corrected spectrum by executing the corrected spectrum calculation step.

\* \* \* \* \*